Feb. 24, 1970    G. K. HELDER ET AL    3,497,641
TEST SET FOR EVALUATION OF ECHO SUPPRESSORS
Filed Aug. 2, 1967    2 Sheets-Sheet 1

INVENTORS G. K. HELDER
J. E. UNRUE, JR.
BY Daniel D. Dubosky
ATTORNEY

PRIMED SPEECH DETECTOR

UNPRIMED SPEECH DETECTOR

United States Patent Office 3,497,641
Patented Feb. 24, 1970

1

3,497,641
TEST SET FOR EVALUATION OF
ECHO SUPPRESSORS
George K. Helder, Rumson, and John E. Unrue, Jr., Freehold, N.J., assignors to Bell Telephone Laboratories Incorporated, Murray Hill, N.J., a corporation of New York
Filed Aug. 2, 1967, Ser. No. 657,954
Int. Cl. H04b 3/46
U.S. Cl. 179—175.31                    11 Claims

ABSTRACT OF THE DISCLOSURE

A first and second source of signals containing speech are each connected to one of the two input ports of an echo suppressor circuit to be evaluated. A coupling circuit is connected between the output port for one of the two transmission paths in the echo suppressor circuit and the input port of the other transmission path in order to provide a simulated echo signal. Schmitt trigger speech detector circuits are connected to the first and second sources of speech signals and to each of the two output ports. Several AND gates in combination with a period pulse producing clock circuit sample the outputs of the speech detector circuits in order to determine the number of instances during which the speech signals have been degraded by operation of the echo suppressor circuit under test.

BACKGROUND OF THE INVENTION

This invention relates to a test set for evaluating echo suppressors and, more particularly, to an echo suppressor test set for performing objective measurements the results of which provide figures of merit for echo suppressor circuits based on the speech degradations introduced by their operation.

In circuits which utilize echo suppressors, three general types of speech degradation may be produced. First, an echo signal may be returned through faulty operation of the echo suppressor circuit at least for an instant before proper operation is achieved. Second, a degradation known in the art as speech mutilation or chopping may be introduced in the case where double talking has occurred, and the echo suppressor circuit has failed to yield instantaneously in providing a transmission path to the second talking party. Third, a speech degradation known in the art as lockout may occur during intervals when two or more echo suppressors in an echo suppressor system have operated simultaneously to block the speech on each of the two one-way transmission paths in a four-wire system.

With the advent of numerous experimental echo suppressors, of echo suppressors from different manufacturers, and of the possibility of having echo suppressors of different types connected in tandem, the problem of subjectively testing the many types of echo suppressors and combinations of echo suppressors has become an extremely large one. Because of the time-consuming and expensive nature of subjective testing, some means was necessary to reduce the amount of subjective testing which is required. Prior to the present invention, the usual method of rating echo suppressor circuits other than by subjective testing has been the use of so-called expert evaluation by persons very familiar with the operation of echo suppressor circuits. This expert evaluation is suspect of many errors since it is difficult for the few experts to decide what is suitable for the many who would evaluate the echo suppressors in a subjective test. Furthermore, at the time of evaluation, the experts may be sick or well, happy or sad, tired or lively, and biased or prejudiced by their previous experiences with the particular echo suppressors under test. All of these factors may have a bearing on the experts' evaluation of an echo suppressor circuit.

It is, accordingly, one object of the present invention to evaluate echo suppressor circuits through objective measurements without the use of so-called experts.

Another object of the present invention is to obtain figures of merit for echo suppressor circuits by which a comparison of the echo suppressor circuits can be made prior to subjective testing.

SUMMARY OF THE INVENTION

These objects and other advantages are attained in the present invention wherein the recorded speech signals of a two-party conversation of a four-wire facility are delivered to the input ports of the two transmission paths normally present in an echo suppressor circuit. A coupling circuit connected between one of the output ports and the input port of the other transmission path provides a simulated echo signal. Schmitt trigger speech detector circuits are connected to each of the speech signal sources and to the output ports to indicate the presence and absence of speech signals at each of these points. Periodic sampling of the state of the Schmitt trigger circuits and comparison of their outputs provides information to several counter circuits which indicate the number of instants during which the echo suppressor circuit has produced speech degradations in the form of echo, chopping or mutilation, and lockout.

BRIEF DESCRIPTION OF THE DRAWING

The invention will be more fully understood through the following detailed description when read in conjunction with the drawings in which.

DETAILED DESCRIPTION

Figure 1:
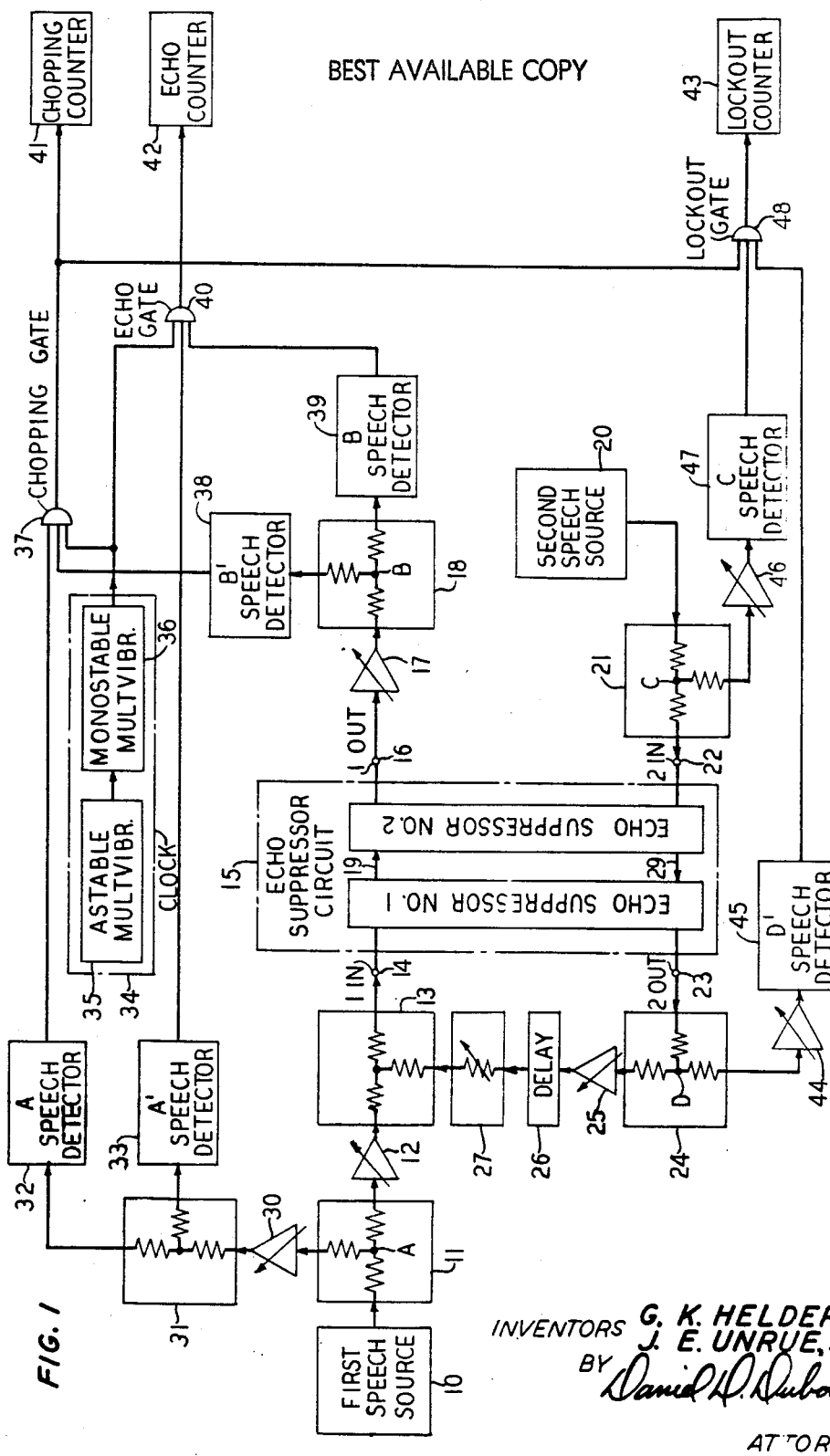
FIG. 1 is a schematic block diagram of one embodiment of the present invention.

In FIG. 1, the circuit to be tested is shown as echo suppressor circuit 15 which has a first input port 14, a first output port 16, a second input port 22 and a second output port 23. Each of the lines in FIG. 1 represents a two-wire transmission path. For purposes of this description, echo suppressor circuit 15 is shown to contain an echo suppressor No. 1 and an echo suppressor No. 2 connected in tandem by way of transmission paths 19 and 29. Echo suppressor No. 1 is connected so as to suppress transmission between first input port 14 and transmission path 19 in response to receiving a speech signal on transmission path 29. Echo suppressor No. 2 is connected so as to suppress transmission between second input port 22 and transmission path 29 in response to a speech signal on transmission path 19. Hence echo suppressors Nos. 1 and 2 are connected in tandem in exactly the same way as they would be connected in a four-wire transmission system where transmission paths 19 and 29 represent the two one-way transmission paths between the remote terminals in a four-wire transmission system.

The echo suppressors may, of course, contain many features of refinement well known to those skilled in the art, but these features are of no importance to the present invention. In addition, the present invention is in no way limited by the type of echo suppressor apparatus contained within circuit 15. Echo suppressor circuit 15 may equally well consist of a single echo suppressor, or any combination of any number of echo suppressors connected in tandem.

A first speech source 10 and a second speech source 20 provide electrical signals at their outputs representing the speech produced on a four-wire transmission system in a conversation between two parties. Typically, first speech source 10 and second speech source 20 are the two tracks of a dual-track recorder, each of whose tracks has previously recorded the speech from one of two parties, preferably a male and a female, in a two-way conversation on a four-wire transmission system. Ideally, the conversation should have many instances of double talking. The signal from first speech source 10 is coupled by way of a splitting pad 11 to the input of a variable amplifier 12. Splitting pad 11, like all other splitting pads shown in FIG. 1 and to be discussed hereinafter, although shown symbolically as three resistors connected to a common junction point, is actually a resistive network designed to provide the proper matching impedances to all of the devices connected to its input and output terminals. Usually, this impedance matching is also accompanied by a finite amount of attenuation between each of the terminals of the splitting pad.

The signal from first speech source 10 after passing through variable amplifier 12 is coupled through a splitting pad 13 to the first input port 14. The signal from second speed source 20 is coupled through a splitting pad 21 to second input port 22. Providing echo suppressor circuit 15 has permitted transmission, the speech signal at input port 14 appears at first output port 16 and is coupled through a variable amplifier 17 to a splitting pad 18. Similarly, the signal at input port 22 from speech source 20 if passed by echo suppressor circuit 15 is coupled from second output port 23 to a splitting pad 24.

In order to simulate an echo signal which would be produced in an actual system at input port 14 by the speech signals which appear at second output port 23, an amplifier 25 couples the speech signal from splitting pad 24 through a variable delay network 26, a variable attenuator 27, and splitting pad 13 to first input port 14. By adjusting the amplification of amplifier 25, the delay of network 26, and the attenuation of attenuator 27, an echo signal of the proper magnitude and delay relative to the speech signal at second output port 23 is produced at first input port 14.

For purposes of this description, the junction point in each of the splitting pads 11, 18, 21 and 24 has been designated by the letters A, B, C and D respectively. The detection of the presence or absence of speed at each of these lettered points is utilized by apparatus to be described hereinafter to determine when specific instances of degradation are produced by the echo suppressor cirpressor circuit under test. For example, if speech is detected at point B, but at that same instant no speech is detected at point A, it may be concluded that the speech at point B was produced as a result of the echo signal coupled from second output port 23 to first input port 14. Similarly, if speech is detected at point A, but is not detected at that same instant at point B, it may be concluded that chopping or multilation has been produced by the echo suppressor circuit under test. Finally, if speech is detected at points A and C, and simultaneously with this detection no speech is detected at points B and D, it may be concluded that the echo suppressor circuit 15 has produced a lockout condition during which no transmission has been permitted in either of the two direction of transmission.

To detect the presence and absence of speech at point A, the signals at point A in splitting pad 11 are coupled through a variable amplifier 30 to a splitting pad 31 which, in turn, distributes equally the signal from point A to the input of a speech detector 32 and a speech detector 33. Speech detector 32, in a manner to be described more completely hereinafter in connection with FIG. 2, produces a logical "1" output when a speech signal is presented to its input from splitting pad 31 and a logical "0" output otherwise. Conversely, speech detector 33 in a manner to be described more completely hereinafter in connection with FIG. 3, produces a logical "0" output when a speech signal is presented to its input from splitting pad 31 and a logical "1" output otherwise. In accordance with standard logical symbols where "1" indicates the presence of speech and a "0" indicates the absence of speech, speech detector 32 has accordingly been labeled A speech detector and speech detector 33 has been accordingly labeled the A′ speech detector. The presence and absence of speech at point B is similarly indicated by logical "1" outputs from a B speech detector 39 and a B′ speech detector 38, respectively, each of which is connected to splitting pad 18. Similarly, the presence of speech at point C is indicated by a logical "1" output from C speech detector 47 whose input is coupled to the speech signals from splitting pad 21 through a variable amplifier 46, and the absence of speech at point D is indicated by a logical "1" output from a D′ speech detector 45 whose input is coupled to splitting pad 24 through a variable amplifier 44.

Variable amplifiers 30, 17, 46 and 44 are each adjusted to provide the proper level of speech signal at each of their corresponding speech detector circuits in order that each speech detector circuit properly responds to the presence of speech at its associated point. Variable amplifier 12, on the other hand, is present solely for the purpose of preventing the simulated echo signal coupled between splitting pad 24 and splitting pad 13 from appearing at point A and thereby resulting in a false indication of speech at the output of first speech source 10. Similarly, amplifier 25 prevents the signal from first speech source 10 from being coupled through the echo simulating path to splitting pad 24 and thereby resulting in a false indication of speech at second output port 23.

With no speech present at point A and a speech signal present at point B, A′ speech detector 33 and B speech detector 39 produce a logical "1" signal at each of their outputs, each of which is connected to one of the three inputs of an AND gate designated in FIG. 1 as echo gate 40. The other input of echo gate 40 is connected to a periodic pulse producing circuit designated in FIG. 1 as clock 34. In clock 34, a free running astable multivibrator 35 triggers a monostable multivibrator 36 to produce periodic voltage pulses at the output of clock 34 with each pulse having a voltage magnitude equivalent to the logical "1" output provided by each of the speech detector circuits. If logical "1" outputs are provided by A′ speech detector 33 and B speech detector 39 during the instant when clock 34 provides a voltage pulse to echo gate 40, gate 40 produces an output which is registered by an echo counter 42 as an indication that echo suppressor circuit 15 has produced a speech degradation in that an echo signal has been permitted to pass.

If speech is present at point A and no speech is present at point B, A speech detector 32 and B′ speech detector 38 provide logical "1" signals to each of two inputs of an AND gate designated in FIG. 1 as chopping gate 37. If these logical "1" signals are provided during the instant when the voltage pulse is coupled from clock 34 to a third input of chopping gate 37, gate 37 produces an output which is registered by a chopping counter 41 as an indication that echo suppressor circuit 15 has produced a speech degradation by chopping or clipping the signal which was presented by speech source 10 and should have been passed to first output port 16.

The output of chopping gate 37 is also connected to one input of a three input AND gate designated in FIG. 1 as lockout gate 48. If a speech signal is present at point C and is not present at point D, C speech detector 47 and D′ speech detector 45 will present logical "1" output signals to the other two of the three inputs of lockout gate 48. If the latter logical "1" output signals also occur during the same instant when chopping gate 37 has produced an output, lockout gate 48 produces an output which, in turn, is registered by a lockout counter 43 as an indication that echo suppressor circuit 15 has produced a speech degradation during that instant by producing a lockout condition, that is, by prohibiting transmission over both of the transmission paths connected between the first and second input and output ports of echo suppressor circuit 15.

Hence, in the test set shown in FIG. 1, each of the speech detector circuits detects the presence or absence of speech at its corresponding lettered point, and the AND gates in combination with periodic pulse producing clock 34 sample the outputs of the appropriate speech detector circuits in order to determine the number of instances during which the speech signals have been degraded by operation of the echo suppressor circuit under test.

Where a logical "1" indicates the presence of speech and a logical "0" indicates the absence of speech, an echo indication will be registered by echo counter 42 when a logical "1" result is obtained from the equation (A'BP) where P is a logical "1" when a pulse occurs at the output of clock 34. A chopping condition will be registered by chopping counter 41 when a logical "1" result is obtained from the equation (AB'P), and a lockout condition will be registered by lockout counter 43 when a logical "1" is obtained from the equation (AB'CD'P). If each speech detector in the FIG. 1 circuit operates with the identical speed of all other speech detectors in the FIG. 1 circuit, the test set of FIG. 1 would operate as described hereinabove and no false indications of speech degradation would be registered by the counters. Element variations and other differences between speech detectors, however, cause variations in the speed with which each speech detector responds to the presence and absence of speech at its input. As a result, unless the conditions described hereinafter are satisfied, false indications of speech degradation may be obtained in each of the counters and attributed to the echo suppressor circuit 15 even though the output from the gate which produces the count has been due entirely to differences in the speed with which speech detectors operate. For example, if the B speech detector 39 produces its logical "1" output faster than the A' speech detector 33 produces its logical "0" output, a false indication of echo may be produced when speech is initiated from first speech source 10 even though no echo from second speech source 20 has been present in echo suppressor circuit 15. In order to avoid erroneous outputs from the gates when speech is initiated, it is necessary that the A' speech detector produce its "0" output faster than the B speech detector produces its "1" output, that the B' speech detector produce its "0" output faster than the A speech detector produces its "1" output, and the D' speech detector produce its "0" output faster than the C speech detector produces its "1" output. In order to avoid erroneous outputs from the gates when speech is terminated, it is necessary that the B speech detector produce its "0" output faster than the A' speech detector produces its "1" output; that the A speech detector produce its "0" output faster than the B' speech detector produces its "1" output; and that the C speech detector produce its "0" output faster than the D' speech detector produces its "1" output. Hence, in all cases, the primed speech detectors (A', B', D') must produce their "0" outputs faster than the unprimed speech detectors (A, B, C) produce their "1" outputs, and the unprimed speech detectors must produce their "0" outputs faster than the primed speech detectors produce their "1" outputs. In short, "0"'s must be produced faster than "1"'s for either the absence or presence of speech.

Figure 2:
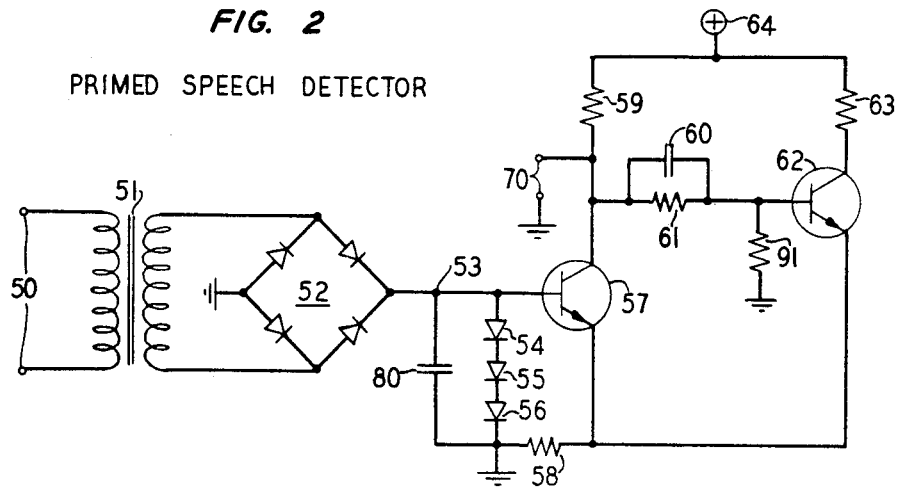
FIG. 2 is a schematic diagram of one of the two types of speech detector circuit shown as blocks in the FIG. 1 block diagram.

In FIG. 2, a schematic diagram is shown of the circuit which is used for all of the primed speech detectors (A', puts, and the unprimed speech detectors must produce B', D') shown in FIG. 1. A speech signal presented to input terminals 50 is coupled by transformer 51 to a full wave diode bridge rectifier 52. The positive DC voltage produced by bridge rectifier 52 in response to speech signals at input terminals 50 is connected across a capacitor 80 which, in turn, is connected between point 53 and ground potential. Transistors 57 and 62 are connected in an emitter-coupled circuit known in the art as a Schmitt trigger circuit. An equivalent vacuum tube Schmitt trigger circuit is shown and described in connection with FIGS. 5–17, page 165 of Pulse and Digital Circuits, by Millman and Taub, 1956. With no speech signal at input terminals 50, no DC voltage is developed at point 53, and consequently, the Schmitt circuit is permitted to remain in its normal OFF state with transistor 62 in conduction and transistor 57 out of conduction. When a positive DC potential of sufficient magnitude is developed at point 53 by a speech signal presented to input terminals 50, the Schmitt circuit is driven to its ON state with transistor 57 in conduction and transistor 62 out of conduction. Diodes 54, 55 and 56 are series connected from point 53 to ground with the same polarization with respect to point 53 as exists for the base-emitter junction of transistor 57 in order to limit the magnitude of positive DC potential which may be developed at point 53, thereby providing a substantially constant potential at point 53 from which capacitor 80 will discharge upon the termination of speech in a substantially constant predetermined interval of time.

With output terminals 70 connected between the collector of transistor 57 and ground, a high positive potential corresponding to a logical "1" is presented at output terminals 70 when no speech is presented to input terminals 50 and a low positive potential corresponding to a logical "0" is presented at output terminals 70 when speech of sufficient magnitude is presented to input terminals 50.

Figure 3:
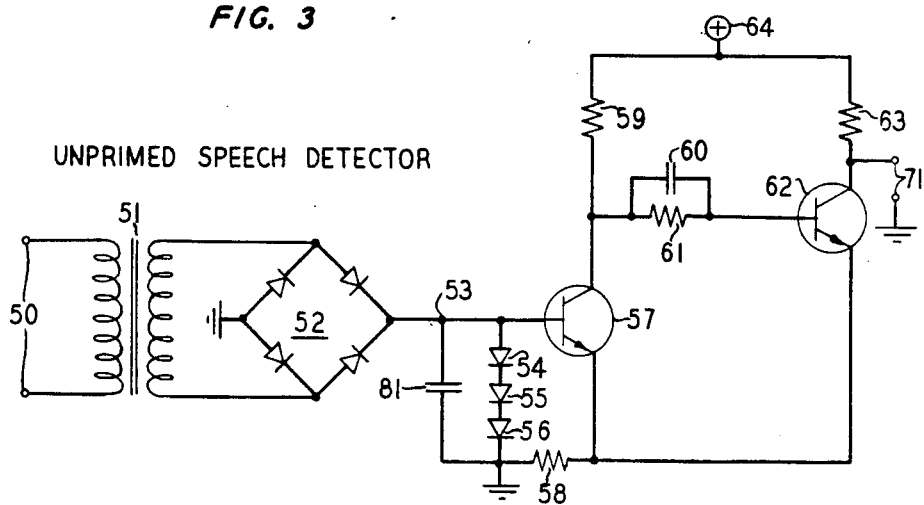
FIG. 3 is a schematic diagram of the other of the two types of speech detector circuit shown as blocks in the FIG. 1 block diagram.

In FIG. 3, a schematic diagram is shown for the circuit which is used for all of the unprimed speech detector circuits (A, B, C) in the FIG. 1 test set. If both the primed and unprimed speech detectors could be left to operate at whatever random speeds were dictated by their combination of elements, the unprimed speech detectors could be made identical to the FIG. 2 primed speech detectors except that output terminals 71 are taken between the collector of transistor 62 and ground, thereby providing an opposite logical result from that obtained from the primed speech detector in response to the presence or absence of a speech signal at input terminals 50. In order to avoid erroneous outputs from the gate circuits however, an interpretation of the above-described conditions which must be satisfied by the primed and unprimed speech detectors results in the conclusion that the Schmitt trigger circuit in the primed speech detector must turn ON faster than the Schmitt trigger circuit in the unprimed speech detector, and the Schmitt trigger circuit in the unprimed speech detector must turn OFF faster than the Schmitt trigger circuit in the primed speech detector circuit. In order to achieve these results, the unprimed Schmitt trigger circuit of FIG. 3, in addition to providing its output at the collector of the opposite transistor, is modified in two respects. First, capacitor 81, although performing in identically the same way as capacitor 80, is chosen to have a value equal to twice the capacity of capacitor 80. As a result, the primed Schmitt trigger circuit is caused to turn ON more rapidly, since the smaller capacitance of capacitor 80 permits point 53 to charge to the potential required to drive transistor 57 into conduction in a shorter period of time than is required in the unprimed speech detector circuit. Second, in the unprimed speech detector circuit, resistance 91, connected in the primed speech detector between the base of transistor 62 and ground potential, is removed. The absence of this resistor makes it easier for transistor 62 to return to its state of conduction, and consequently the Schmitt circuit in the unprimed speech detector turns OFF faster than the Schmitt circuit in the unprimed speech detector. Resistance 91 also aids in the turn-on phase since its presence causes less current to flow through the base-emitter junction of transistor 62 during conduction, thereby making it easier to take transistor 62 out of conduction, an accordingly causing the primed Schmitt trigger circuit to turn ON faster than the unprimed Schmitt trigger circuit.

What has been described hereinabove is a specific illustrative embodiment of the principles of the present invention. It is to be understood that numerous other arrangements of physical parts and different component parts may be utilized with equal advantage. For example, in the FIG. 1 test set, in order to test both one-way transmission paths of echo suppressor circuit 15 for echo and chopping degradation, it is necessary to make a first test with the echo suppressors numbered 1 and 2 connected as shown and a second test with first input port 14 connected to splitting pad 21, second input port 22 connected to splitting pad 13, first output port 16 connected to splitting pad 24, and second output port 23 connected to amplifier 17. If time is of the essence, it will be readily appreciated by those skilled in the art that a C' speech detector, a D speech detector, and a second echo path between first output port 16 and second input port 22, could easily be added to the FIG. 1 test set in order to drive a second chopping gate and counter and a second echo gate and counter. As a result, all speech degradation figures of merit would be obtained simultaneously for both transmission paths.

What is claimed is:

1. Apparatus for evaluating an echo suppressor circuit having first and second input and output ports, means for connecting a first input signal containing speech to the first input port, means for connecting a second input signal containing speech to the second input port, means connected between the second output port and the first input port for providing a simulated echo signal at said first input port, means for establishing figures of merit relating to degradation produced by said echo suppressor circuit in the speech contained in said first and second input signals, said figures of merit establishing means comprising, in combination, a first means for determining the number of instants during which speech is absent in said first input signal and present at said first output port, a second means for determining the number of instants during which speech is present in said first input signal and absent at said first output port, and a third means for determining the number of instants during which speech is present in said first and second input signals and absent at said first and second output ports.

2. Apparatus as defined in claim 1 wherein said first, second, and third number determining means each includes a first speech detection means for providing at its output a first potential in response to the presence of speech at its input and a second potential in response to the absence of speech at its input, and a second speech detection means for providing at its output said first potential in response to the absence of speech at its input and said second potential in response to the presence of speech at its input, said first speech detection means providing said first potential at its output faster than said second speech detection means provides said second potential at its output in response to the presence of speech at their respective inputs, and said second speech detection means providing said first potential at its output faster than said first detection means provides said second potential at its output in response to the absence of speech at their respective inputs.

3. Apparatus as defined in claim 2 wherein said first, second, and third number determining means each further includes AND gating means having at least two inputs and an output, means for connecting the output of said first speech detecting means to one of said two inputs and the output of said second speech detecting means to the other one of said two inputs of said gating means, and means for counting the number of instants during which an output appears at said AND gating means.

4. In apparatus for evaluating an echo suppressor circuit having first and second input and output ports, means for connecting a first input signal containing speech to the first input port means for connecting a second input signal containing speech to the second input port, means connected between the second output port and the first input port for providing a simulated echo signal at said first input port of a signal at said second output port, first detector means for providing an output indicaion in response to speech in said first input signal, second detector means for providing an output indication in response to speech at said first output port, means for periodically sampling the outputs of said first and second detector means, and counting means responsive to said sampling means for counting the number of instants during the sampling that speech is absent in said first input signal and present at said first output port, the count thereby obtained being an indication as to the number of instances that an echo signal has been permitted to pass to said first output port.

5. In apparatus as defined in claim 4 wherein said counting means further includes means for obtaining a second count of the number of instants during the sampling that speech is present in said first input signal and absent at said first output port, said second count being an indication as to the number of instances that speech in said first input signal has been chopped by said echo suppressor circuit.

6. In apparatus for evaluating an echo suppressor circuit having first and second input and output ports, means for connecting a first input signal containing speech to the first input port, means for connecting a second input signal containing speech to the second input port, means connected between the second output port and the first input port for providing a simulated echo signal at said first input port of speech in said second input signal, first speech detector means for providing a first output signal in response to the absence of speech in said first input signal, second speech detector means for providing a second output signal in response to the presence of speech at said first output port, means for periodically sampling the outputs of said first and second speech detector means, and means for counting the number of times during the sampling that said first and second output signals occur simultaneously, the count thereby obtained being an indication as to the number of instances during which an echo signal of said second speech signal has been permitted to pass to said first output port.

7. In apparatus as defined in claim 6 wherein said first speech detector means removes its first output signal in response to the presence of speech in said first input signal faster than said second detector means provides said second output signal, and said second speech detector means removes its second output signal in response to the absence of speech at said first output port faster than said first speech detector means provides said first output signal.

8. In apparatus for evaluating an echo suppressor circuit having first and second input and output ports, means for connecting a first input signal containing speech to the first input port, means for connecting a second input signal containing speech to the second input port, means connected between the second output port and the first input port for providing a simulated echo signal at said first input port of speech in said second input signal, first speech detector means for providing a first output signal in response to the presence of speech in said first input signal, second speech detector means for providing a second output signal in response to the absence of speech at said first output port, means for periodically sampling the ouputs of said first and second speech detector means, and means for counting the number of times during the sampling that said first and second output signals occur simutaneously, the count thereby obtained being an indication as to the number of instances during which speech in said first input signal has been prevented by said echo suppressor circuit from passing to said first output port.

9. In apparatus as defined in claim 8 wherein said first speech detector means removes its first ouput signal in response to the absence of speech in said first input signal faster than said second speech detector means provides said second output signal, and said second speech detector means removes its second output signal in response to the presence of speech at said first output port faster than said first speech detector means provides said first output signal.

10. In apparatus as defined in claim 9 wherein the apparatus further includes a third speech detector means for providing a third output signal in response to the presence of speech in said second input signal, fourth speech detector means for providing a fourth output signal in response to the absence of speech at said second output port, means for periodically sampling the outputs of said first, second, third, and fourth speech detector means, and means for counting the number of times during the sampling that said first, second, third, and fourth output signals occur simultaneously, the count thereby obtained by the latter counting means being an indication as to the number of instances during which speech has been prevented by said echo suppressor circuit from passing both from said first input port to said first output port and from said second input port to said second output port.

11. In apparatus as defined in claim 10 wherein said third speech detector means removes its third output signal in response to the absence of speech in said second input signal faster than said fourth speech detector means provides said fourth output signal, and said fourth speech detector means removes its fourth output signal in response to the presence of speech at said second output port faster than said third speech detector means provides said third output signal.

No references cited.

KATHLEEN H. CLAFFY, Primary Examiner

THOMAS L. KUNDERT, Assistant Examiner